Sept. 13, 1960
G. T. SEABORG
2,952,601
NUCLEAR CONVERSION APPARATUS
Filed Nov. 2, 1945
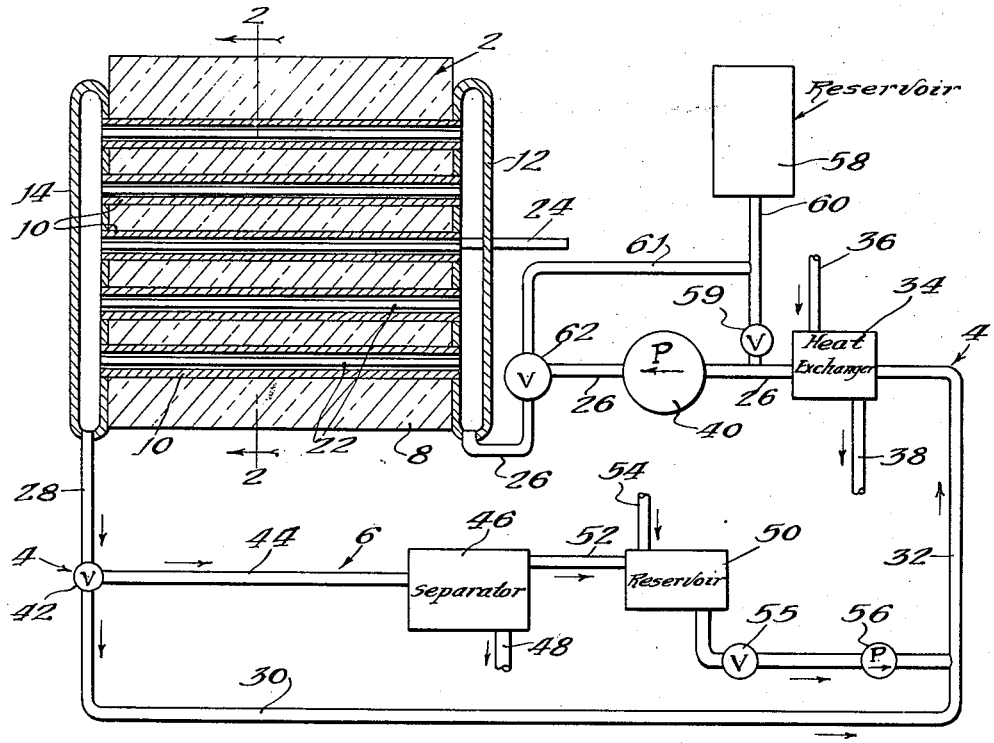
FIG.1.
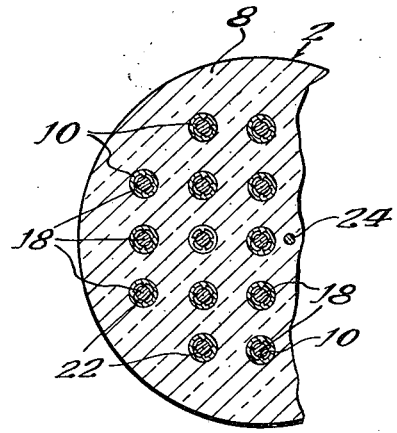
FIG.2.
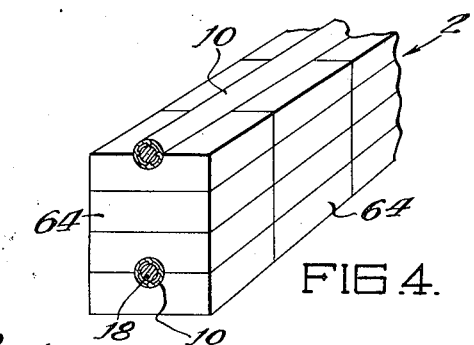
FIG.3.
FIG.4.
Witnesses:
Herbert E. Metcalf
Walter L. Schlegel, Jr.
Inventor:
Glenn T. Seaborg
By:
Robert A. Lowndes
Attorney

United States Patent Office 2,952,601
Patented Sept. 13, 1960

2,952,601
NUCLEAR CONVERSION APPARATUS

Glenn T. Seaborg, Chicago, Ill., assignor to the United States of America as represented by the United States Atomic Energy Commission Filed Nov. 2, 1945, Ser. No. 626,382

1 Claim. (Cl. 204—193.2)

This invention relates to neutronic reactors and more particularly to the preparation therein of masses and compositions of the isotope of uranium having a mass of 233, said isotope being designated as $92^{233}$ or $U^{233}$.

In neutronic reactors a neutron fissionable isotope such as $U^{233}$, $U^{235}$, or $94^{239}$ or mixtures thereof is subjected to fission by adsorption of neutrons, and a self-sustaining chain reaction is established by the neutrons evolved by the fission. In general such reactors comprise bodies of compositions containing such fissionable material, for example, natural uranium, disposed in a neutron slowing material which slows the neutrons to thermal energies. Such a slowing material is termed a neutron moderator. Carbon and $D_2O$ (heavy water) are typical moderators suitable for such use. Heat is evolved during the reaction which is removed by passage of a coolant through the reactor in heat exchange relationship therewith. Specific details of the theory and essential characteristics of such reactors are set forth in copending application of Enrico Fermi and Leo Szilard, Serial No. 568,904, filed December 19, 1944, now Patent No. 2,708,656, dated May 17, 1955.

An object of this invention is to provide a novel method and means for producing $U^{233}$ and compositions containing $U^{233}$ in which the amounts of foreign products particularly fission products of $U^{233}$ are maintained below a predetermined amount.

Another object of the invention is to provide a novel method and means for bombarding thorium-containing material with neutrons generated by a neutronic reactor, thereby converting $Th^{232}$ to $U^{233}$ as hereinafter more fully discussed.

Still another object of the invention is to pass a coolant comprising thorium through a neutronic reactor thereby accomplishing the dual function of removing heat therefrom and converting $Th^{232}$ to $U^{233}$.

Other objects and advantages of the invention will become apparent from the following detailed description taken with the accompanying drawing, in which:

Fig. 1 is a flow diagram of a system embodying the invention, the neutronic reactor being shown in section along a vertical plane substantially bisecting said reactor longitudinally thereof;

Fig. 2 is a fragmentary sectional view of the reactor taken in the transverse vertical plane indicated by the line 2—2 of Fig. 1;

Fig. 3 is an enlarged transverse sectional view taken through one of the reactor tubes and associated uranium rod shown in Figs. 1 and 2; and Fig. 4 is a fragmentary perspective view illustrating the actual construction of the reactor diagrammatically shown in Figs. 1 and 2.

In this specification and claim the name of the element thorium is used to designate the element generically either in its elemental or combined state unless otherwise indicated by the context.

Describing the invention in detail, the system comprises a neutronic reactor generally designated 2, a fluid circulating system generally designated 4 associated with said reactor, and a by-pass circuit generally designated 6.

The reactor 2 is herein illustrated as comprising a matrix 8 of neutron moderator such as graphite or heavy water with tubes extending therethrough, said tubes being connected at opposite ends thereof to inlet and outlet headers 12 and 14, respectively.

Each tube 10, as clearly seen in Fig. 3, comprises ribs or lugs 16 on the inner perimeter thereof for positioning centrally thereof a uranium rod 18 thus providing a substantially annular fluid passage 20 around said rod. The rod 18 is preferably completely enclosed within a jacket 22 in thermal contact therewith, said jacket being formed of any desired neutron-permeable fluid-tight substance having a relatively low neutron capture cross section such as, for example, aluminum or beryllium.

It may be noted that only a few of the tubes 10 and associated rods 18 are illustrated herein for the purpose of clarity, and it will be understood that in actual practice an operative reactor of this type may be constructed in accordance with the disclosure of the above-mentioned copending application.

The nuclear fission chain reaction within the reactor 2 is preferably regulated by one or more control rods 24, each of said rods being movable lengthwise thereof through a complementary slot in the reactor to regulate the reaction therein by regulating neutron losses thereof, as is more fully described in said copending application.

The circulating system 4 comprises inlet and outlet pipes 26 and 28 connected to respective headers 12 and 14. The outlet pipe 28 is connected to a pipe 30 which is in turn connected to a pipe 32 leading to a conventional heat exchanger device 34 through which a coolant fluid is passed by means of inlet and outlet pipes 36 and 38, said fluid passing through the device 34 in heat exchange relationship with the fluid flowing through the pipe 32. The heat exchanger 34 is connected to the inlet pipe 26 at the suction side of a pump 40 associated therewith.

During operation of the neutronic reactor 2 a coolant fluid is circulated through the tubes 10 by means of the above-described system, said coolant fluid including thorium which is bombarded by slow and moderately fast neutrons within the reactor 2 to produce $U^{233}$ in accordance with a nuclear reaction hereinafter discussed in detail.

The coolant fluid flowing through the tubes 10 may contain thorium in any form such as the carbonate, the fluoride, or the peroxide thereof; and preferably said coolant fluid is in the form of a solution of thorium nitrate or carbonate in a carrier liquid such as ordinary water or in the form of a slurry of thorium peroxide powder and a carrier liquid such as ordinary water.

It is known that the bombardment of thorium with slow and moderately fast neutrons produces $U^{233}$ in accordance with the following reaction:

$$_{90}Th^{232} + _{0}n' \rightarrow _{90}Th^{233} + \gamma$$

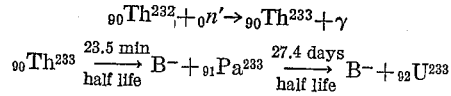

Where a $U^{233}$ atom thus formed absorbs a neutron and is fissioned thereby, the fission products which are produced as a result of the fission of $U^{233}$ with slow and moderately fast neutrons are substantially the same as those produced by the fission of $U^{235}$. They consist of a large number of elements which generally fall into a light group with atomic numbers from about 35 to 46, inclusive, and a heavy group with atomic numbers from about 51 to 60, inclusive, and which undergo beta decay. The fission products which have a half-life of more than three days will remain in the reaction mass in substantial quantities at least one month after the termination of the reaction, and the process of the present invention is particularly advantageous in reducing these fission products to a minimum.

Thus it will be understood that the coolant is preferably removed from the system 4 by means of the circuit 6 hereinafter described in detail at a sufficient rate to prevent the rate of neutron absorption by $Pa^{233}$ and/or $U^{233}$ from becoming excessively high. In general, it may be said that such a condition prevails when the ratio of $U^{233}+Pa^{233}$ to unreacted $Th^{232}$ exceeds about 1 to 100. In other words, the coolant is preferably withdrawn from the system 4 at a rate sufficient to prevent a concentration of $U^{233}$ greater than approximately one percent of the thorium present in the coolant thus diminishing the danger of substantial decomposition of the isotope $U^{233}$ occurring by neutron bombardment within the reactor.

In actual practice it is generally desirable to withdraw the coolant from the system 4 at a rate sufficient to prevent the combined weights of $U^{233}$ and $Pa^{233}$ compared to the quantity of $Th^{232}$ from exceeding 1 to 1,000 and frequently between 1 to 10,000 and at least 1 to 1,000,000, thereby reducing the amount of fission products in the thorium and making possible the isolation of $U^{233}$ by ordinary chemical means without the utilization of elaborate and expensive apparatus.

The coolant is withdrawn from the system 4 by means of the above-mentioned by-pass circuit 6 which includes a conventional two-way operating valve 42 in the pipe 28, said valve being connected to a pipe 44 which is in turn connected to a conventional separator device 46 comprising conventional means (not shown) for separating the thorium from the carrier fluid. The thorium is conveyed from the separator 46 by an outlet pipe 48 to accommodate treatment of the thorium to recover $Pa^{233}$ and $U^{233}$ by any suitable methods, several of which are disclosed in detail in a copending application, U.S. Serial No. 561,832, filed November 3, 1944, by Glenn T. Seaborg et al., now abandoned.

The coolant carrier fluid is conveyed from the separator device 46 to a reservoir 50 through a pipe 52, said reservoir having an inlet 54 through which additional thorium in suitable form may be introduced into the system. The reservoir 50 is connected through a conventional shut-off valve 55 to the suction side of a pump 56 which discharges into the before-mentioned pipe 32 of the system 4.

As the result of withdrawing the coolant fluid from the system 4 by means of the circuit 6, the amount of coolant in the system is diminished, and a make-up coolant tank or reservoir 58 is provided for supplying additional coolant to the system 4 to make up the losses therefrom as the result of withdrawing said coolant by means of the by-pass circuit 6. The tank 58 is connected to a pipe 60 which is in turn connected to the inlet pipe 26 at the suction side of pump 40, through a conventional operating valve 59 which is adjustable to control the amount of fluid introduced into the system 4 from the tank 58. The pipe 60 comprises a branch pipe 61 connected to the pipe 26 at the discharge side of the pump 40 through a conventional two-way operating valve 62. Thus, by regulating the valves 59 and 62, coolant may be pumped into the pipe 26 from the tank 58 or into said tank from the pipe 26. By means of this arrangement, the coolant may, if desired, be quickly withdrawn from the system 4 and conveyed to the tank 58 for storage therein upon termination of the neutronic reaction within the reactor 2.

It will be understood that, if desired, the valve 55 may be closed, and all of the coolant passing through the separator 46 may thus be cut off from the system 4, fresh coolant being supplied from the tank 58 through the valve 59.

In actual practice, a graphite moderated reactor is built up by piling graphite blocks 64 in the manner illustrated in Fig. 4, with the tubes 10 disposed in complementary grooves within the associated blocks. This construction has given rise to the term "pile" which is frequently applied to a neutronic reactor whether it comprises a solid or a fluid neutron moderator. The generic term "reactor," however, is preferable and is used in this specification and claims, inasmuch as the invention is applicable to any suitable form of neutronic reactor capable of sustaining a nuclear fission chain reaction while bombarding the thorium in the coolant.

While the theory of nuclear reactions set forth herein is based on the best presently known experimental evidence, the invention is not limited thereto, as additional experimental data later discovered may modify the theory disclosed.

Obviously, many modifications may be made in the specific embodiments disclosed without departing from the intended scope of the invention.

What is claimed is:

In apparatus of the class described, means for sustaining a nuclear fission chain reaction comprising a body of neutron moderator, tubes extending therethrough, uranium within said tubes in an amount sufficient to produce a self-sustaining chain reaction, a fluid circulating system associated with said tubes, a thorium-containing fluid coolant in the system and tubes, and means for withdrawing quantities of said fluid from said circulating system and for replacing said withdrawn quantities, whereby the neutron bombarded thorium in said withdrawn quantities may be treated externally of said circulating system to recover thorium conversion products.

References Cited in the file of this patent

UNITED STATES PATENTS

| 2,708,656 | Fermi et al. | May 17, 1955 |

FOREIGN PATENTS

| 114,150 | Australia | May 2, 1940 |
| 861,390 | France | Oct. 28, 1940 |
| 233,011 | Switzerland | Oct. 2, 1944 |

OTHER REFERENCES

Seaborg et al., MDDC-787, USAEC, declassified Jan. 28, 1947, published Apr. 15, 1942.

Kelly et al.: Phy. Rev., 73, 1135-39 (1948).